Sept. 29, 1959    L. A. FOX    2,906,289
RELIEF VALVE
Filed Dec. 14, 1956

# United States Patent Office 2,906,289
Patented Sept. 29, 1959

2,906,289

RELIEF VALVE

Louis A. Fox, Fort Wayne, Ind., assignor to Kunkle Valve Company, Fort Wayne, Ind., a partnership Application December 14, 1956, Serial No. 628,400

2 Claims. (Cl. 137—508)

The invention relates to pressure relief valves for relieving pressures at a predetermined maximum and has reference more particularly to an improved type of relief valve having floating valve members and which will be highly efficient in operation and reliable in use.

A primary object of the invention is to provide a compact, durable and efficient pressure relief valve which will incorporate floating valve members having coaction in a manner to provide a floating valve seat and wherein said valve members will remain pressure-tight to the opening point and thereafter will provide an annular opening of sufficient size so that following a relatively short blow-off period the valve members will close again with another pressure-tight engagement.

Another object of the invention is to provide a safety relief valve characterized by floating valve members having coaction in a manner to form a floating valve seat, the said valve members being located in a common bore, thus simplifying the control of the valve members during operation and which also assists in the self-aligning action of the valve members particularly in a closing direction to produce a pressure-tight seal.

Another object is to provide a relief valve for the purposes described which will incorporate floating valve members having coaction to open and close at predetermined pressures and wherein one valve member is provided with a deformable insert for contact with a conical metal seat provided by the other valve member.

A further object is to provide a safety relief valve incorporating floating valve members, both of which have location within a central bore, said valve members being maintained in releasable seating contact by opposed coil springs and which are so arranged that the top coil spring exerts its force at a location below the seating contact of the valve members to produce a toggle action of the several coacting parts whereby to facilitate the self-aligning function of said valve members.

Another object is to provide a safety relief valve having opposed coil springs for exerting a force on the valve members to maintain the members in closed relation, said valve members opening, however, when subjected to a pressure exceeding a preset limit and wherein said pressure can be preset by adjustment of a threaded pressure screw having associated relation with one of the coil springs.

A still further object is to provide a safety relief valve characterized in that the valve members have location within a common bore which is in communication at its bottom end with a source of fluid under pressure and which is sealed at its open top end by special sealing rings carried by the upper valve member.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

Figure 1:
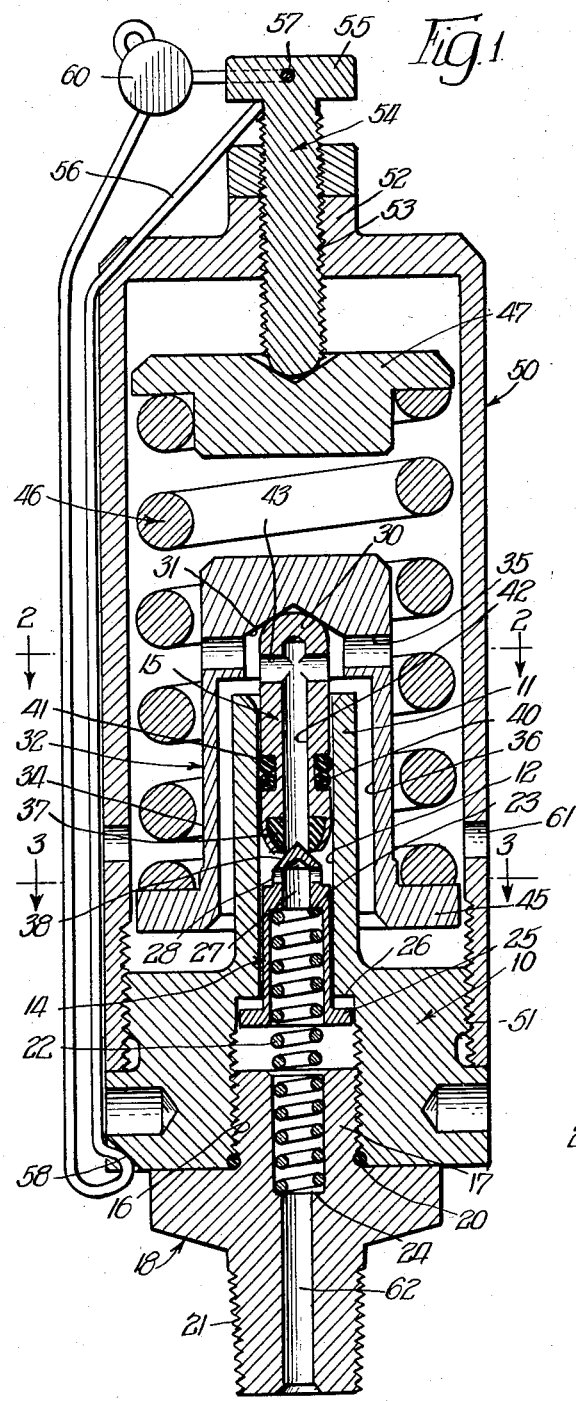
Figure 1 is a longitudinal, sectional view taken substantially through the center of a pressure relief valve embodying the several improved features of the present invention.
Figure 2:
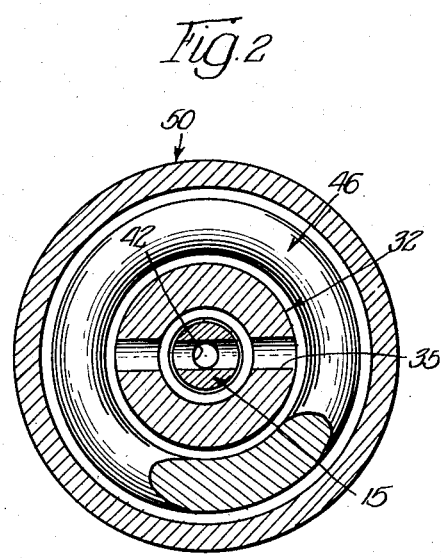
Figure 2 is a transverse sectional view taken substantially along line 2—2 of Figure 1.
Figure 3:
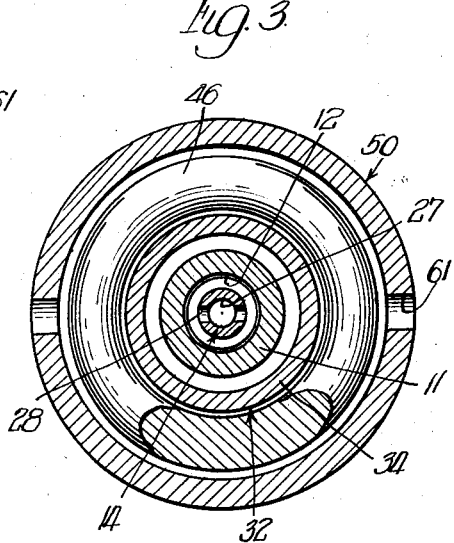
Figure 3 is a transverse sectional view taken substantially along line 3—3 of Figure 1.

The valve selected for illustration in the drawings includes a body portion 10 having an upstanding cylindrical part 11, said body portion and cylindrical part being provided with a central bore 12 extending longitudinally through the same. The bore through the cylindrical part 11 is smooth surfaced and of a diameter to accommodate the valve members 14 and 15. However, the lower end of the bore is slightly enlarged in diameter and this enlarged part is threaded as at 16 for receiving the threaded end 17 of the bushing 18. A ring seal 20 is located at the annular meeting edges between the body portion 10 and the bushing 18 in order to securely seal the joint, notwithstanding the threaded relation of the parts. The reduced lower end of bushing 18 is threaded at 21 for securing the valve to a pressure vessel such as a tank or container, or for securing the valve to a pressure line or the like. When the pressure of the fluid within the vessel or line exceeds the limit for which the valve is set the valve will open in a manner as will be presently described, to thereby lower the pressure, and when a predetermined lower limit is reached the valve members will close again to form a pressure-tight seal.

The bottom valve member 14 is associated with a coil spring 22 which yieldingly forces the said valve member upwardly toward the top valve member 15. The coil spring has location within aligned bores formed in the bottom valve member and in the bushing, respectively, with the upper end of the coil spring having contact with the shoulder 23 within the bottom valve member and the lower end of the coil spring having contact with shoulder 24 provided by the bushing. The annular laterally extending flange 25 forms the base of the bottom valve member and said flange has location within the enlarged portion of bore 12 above the threads 16 so that the bottom valve member is free to move longitudinally within the smooth surfaced part of bore 12, being limited in said movement, however, by the shoulder 26 provided by the body portion 10, which limits upward movement of the bottom valve member, whereas the part 17 of bushing 18 limits downward movement of said bottom valve member. The axial passage 27 and the connecting lateral passages 28 complete the formation of this bottom valve member.

The top valve member 15 extends above the cylindrical part 11 and this projecting end of the member is rounded as at 30 for receiving the conically shaped recess 31 provided by the toggle cap 32. Actually the top valve member 15 forms a supporting post for the toggle cap and the contact between the rounded end 30 thereof and the surface of the conical recess 31 is similar to a ball and socket joint since the toggle cap has freedom of movement in all directions. Further, whatever position the toggle cap may assume in reaching its own level, the same is not transmitted to the top valve member. On the contrary the top valve member is independent of toggle cap movement and the valve member will therefore maintain a true axial position within the bore 12 so as to facilitate movement of the valve member for pressure release. The cylindrical part 34 of the toggle cap 32 is spaced from part 11 of the body portion and is provided with transverse passages 35 which have communicating relation with the central interior opening 36. The upper valve member 15 is provided with an insert 37 of plastic such as nylon or any other suitable material, and which insert is adapted to have contact with the conical seat 38 provided by the bottom valve member 14. The top valve member 15 is sealed within the bore 12 by means of the O-ring 40 and the back-up ring 41. Also, the valve member is formed with a central passage 42 extending axially through the member from the plastic insert 37 to the transverse passages 43 which connect with passage 42.

On the exterior of the toggle cap 32 the cylindrical part 34 thereof is formed with an annular laterally extending flange 45. Said flange supports the lower end of the coil spring 46, having surrounding relation with the toggle cap and which is confined between the annular flange 45 and the top spring plate 47.

The mechanism of the present valve is enclosed within the cylindrical housing 50, having threads 51 for threaded relation with the threaded exterior of the body portion 10 by means of which the cylindrical housing is secured in place. The boss 52, located at the top end of the housing, is formed with an opening in longitudinal alignment with the axial center of the housing and said opening is threaded as at 53 for receiving the threaded adjusting screw 54. The head end 55 of the screw may be square to facilitate the application of a wrench or other tool thereto for rotating the screw, whereby the tension applied to the coil spring 46 may be adjusted. As shown in Figure 1, after the screw has been rotated to place coil spring 46 under the tension desired for the particular relief valve, the screw may be locked in adjusted position by the insertion of the wire 56 within opening 57. The wire extends to one side of the housing 50 and passes through an opening 58 in the bottom edge of the body portion 10 and then the wire extends upwardly again, where the same is joined and sealed to the member 60. One or more relief openings 61 are formed in the housing 50 and which permit the escape of the pressure medium during the blow-off period of the valve.

For describing the operation of the present relief valve it will be assumed that the bushing 18 is connected to a source of fluid under pressure, which fluid will accordingly enter the central passage 62 in the opening and which will flow in and around the valve member 14 and into the bore 12. The pressures exerted against the inner walls of the bottom valve member are equal to and offset those exerted against the outer walls. However, the forces are out of balance by that portion sealed off by the plastic insert 37. Accordingly, the bottom valve member 14 is responsive to the upward force of both the coil spring 22 and the differential fluid force to maintain the valve member in seating contact with the insert 37 of the upper valve member 15. As regards the upper valve member, the tension exerted by coil spring 46 is transmitted to the said member to force the same downwardly into contact with the bottom valve member, and, as described, this tension can be adjusted by the pressure adjusting screw 54 and which will determine the relief pressure at which the valve will blow off.

For normal operation the tensions exerted by the opposed coil springs 22 and 46 will maintain the valve members in floating relation within the longitudinal bore 12. The bore maintains the floating valve members in axial alignment and which is facilitated by the ball and socket supporting action between the upper end of the valve member 15 and the toggle cap 32. As a result, the toggle cap is free to seek its own position on the valve member and its movement is not transmitted to the valve member so that the member is free to assume a true axial position within the longitudinal bore 12. In this connection, another feature of the invention resides in the arrangement and positioning of the toggle cap with respect to the seating contact between the valve members. The toggle cap depends some distance below the seating contact of the members and at this point it provides the laterally projecting flange 45 for supporting the lower end of the coil spring 46. Accordingly, the positioning of the parts with respect to each other results in a toggle arrangement which further facilitates the self-aligning action of the upper valve member with the bottom valve member while at the same time permitting free movement of the valve members within the bore 12.

Movement of both valve members will take place as a unit as the pressure of the fluid may vary. Assuming that the pressure of the fluid should increase, the same will act on the upper valve member 15 to move the member upwardly in opposition to the force exerted by coil spring 46. As previously explained, said valve member 15 is effectively sealed with respect to the cylindrical walls of bore 12 by means of the O-ring 40 and the backup ring 41. The special rings prevent escape of the pressure fluid from the bore while at the same time permitting axial movement of the valve members. Should the pressure of the medium continue to increase, the flange 25 of the bottom valve member 14 will eventually come into contact with the shoulder 26. Thus further upward movement of the bottom valve member is prevented, notwithstanding the force exerted by coil spring 22. When this position of the valve members is reached, any further increase in the pressure of the fluid to produce upward movement of valve member 14 will cause the members to separate and thus the pressure fluid will be released to passage 42 for escape through passages 43, 35 and 61 to the atmosphere.

In the present relief valve the floating action of the valve members, that is, their up and down movement as a unit, takes place within longitudinal bore 12, which thus controls their alignment. The pressure-tight seal during the floating period is a result of the force coil spring 22 exerts and the differential effect of the fluid pressure. Also toggle cap 32 and bottom valve member 14 are limited in both their upward and downward movement. For example, the toggle cap can move down until the flange 45 contacts the body portion 10. However, upward movement of the bottom valve member is more important since after contact of flange 25 with shoulder 26 any further increase in pressure will produce a blow-off of the valve and thus coaction of these parts determines the pressure at which the valve gives relief.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a relief valve, in combination, a body portion providing an upstanding cylindrical part, said part and body portion having a longitudinal cylindrical bore extending through the same from end to end, means connecting the longitudinal bore with a source of fluid under pressure, a bottom valve member within the bore and providing a valve seat, an upper valve member within the bore in sealing relation with the cylindrical walls thereof, said upper valve member having a flow passage therethrough, said upper valve member at one end having seating contact on the valve seat to close the flow passage and said member having its opposite rounded top end projecting beyond the cylindrical part, a coil spring within the bore and contacting the bottom valve member for urging the member into contact with the upper valve member, a toggle cap in supported relation on the rounded top end of the upper valve member, said toggle cap having spaced surrounding relation with the cylindrical part and depending exteriorly thereof to below the seating contact of the upper valve member with the bottom valve member, an annular flange provided by the toggle cap at said depending end, a second coil spring supported by the annular flange and disposed in surrounding relation with the toggle cap, means for tensioning said second coil spring to thereby vary the pressure of the spring tending to force the upper valve member into contact with the bottom valve member, and stop means provided by the body portion for limiting movement of the bottom valve member in a direction towards the upper valve member.

2. In a relief valve, the combination with a body portion having an upstanding cylindrical part, said part and body portion having a longitudinal cylindrical bore extending centrally through the same, hollow cylindrical valve members within the bore including a bottom valve member providing a valve seat at its upper end and an upper valve member in contact at its lower end with the valve seat, said upper valve member having sealing relation with the cylindrical walls of the bore whereby the valve is closed when the valve members are in contact and is open when the upper valve member is lifted from the valve seat, said upper valve member extending above the cylindrical part to provide a rounded top end, a coil spring means for forcing the bottom valve member toward the upper valve member, a second coil spring means for forcing the upper valve member toward the bottom valve member, a toggle cap interposed between the second coil spring and the upper valve member, said toggle cap being supported on the rounded top projecting end of the upper valve member and depending exteriorly in spaced relation to both said rounded top projecting end and cylindrical part, and said second coil spring having supporting contact on the toggle cap at a location below the valve seat, whereby a toggle arrangement is provided to facilitate the self-aligning action of the upper valve member in seating on said valve seat, and means for limiting movement of the bottom valve member in a direction toward the upper valve member.

References Cited in the file of this patent

UNITED STATES PATENTS

| | | |
|---|---|---|
| 269,534 | Orme | Dec. 26, 1882 |
| 1,890,248 | Edwards | Dec. 6, 1932 |
| 2,278,437 | Gentzel | Apr. 7, 1942 |
| 2,320,339 | Buttner | June 1, 1943 |
| 2,451,586 | Strid | Oct. 19, 1948 |
| 2,771,248 | Ehlke | Nov. 20, 1956 |

FOREIGN PATENTS

| | | |
|---|---|---|
| 659,079 | Great Britain | Oct. 17, 1951 |
| 1,091,327 | France | Oct. 27, 1954 |